(12) United States Patent
Lévesque et al.

(10) Patent No.: US 8,771,823 B2
(45) Date of Patent: Jul. 8, 2014

(54) THERMOPLASTIC PART, TOOL AND METHOD FOR THE MANUFACTURING THEREOF

(75) Inventors: Martin Lévesque, Lachenaie (CA); Marc Grenier, Lavaltrie (CA); Jonathan Gagnon, Montréal (CA)

(73) Assignees: Huchinson Aéronautique & Industrie Limitée, Montréal (CA); Hutchinson Aerospace & Industry Limited, Montréal (CA)

( * ) Notice: Subject to any disclaimer, the term of this patent is extended or adjusted under 35 U.S.C. 154(b) by 689 days.

(21) Appl. No.: 11/776,878

(22) Filed: Jul. 12, 2007

(65) Prior Publication Data

US 2008/0014453 A1 Jan. 17, 2008

Related U.S. Application Data

(60) Provisional application No. 60/807,392, filed on Jul. 14, 2006.

(51) Int. Cl.
*B32B 3/00* (2006.01)
*B32B 1/00* (2006.01)

(52) U.S. Cl.
USPC .......................... 428/174; 428/156; 428/172

(58) Field of Classification Search
USPC ......... 428/156, 167, 171, 172, 174, 177, 178, 428/179
See application file for complete search history.

(56) References Cited

U.S. PATENT DOCUMENTS

| | | | |
|---|---|---|---|
| 5,041,260 A * | 8/1991 | Johnson et al. | 264/510 |
| 5,294,139 A * | 3/1994 | Cazaillon et al. | 280/610 |
| 6,506,334 B1 * | 1/2003 | Ellison et al. | 264/510 |
| 6,685,789 B1 * | 2/2004 | Wissing | 156/212 |
| 6,875,826 B1 * | 4/2005 | Huovinen et al. | 526/64 |
| 2005/0284562 A1 | 12/2005 | Frantz et al. | |

OTHER PUBLICATIONS

Tencate website, Press forming of CETEX—Continuous Fiber Reinforced Thermoplastics (www.tenCate.com).
Tencate, Press Forming of CETEX Continuous Fiber Reinforced Thermoplastics, Morgan Hill, California, pp. 1-21.

* cited by examiner

*Primary Examiner* — Catherine A Simone
(74) *Attorney, Agent, or Firm* — Benoît Côté Inc.

(57) ABSTRACT

A composite part comprises a sheet of fiber-reinforced thermoplastic material and a sheet of non-reinforced thermoplastic material superposedly attached together. Both sheets are jointly deformed substantially differently along different axes. A tool for manufacturing the part made of the sheet of thermoplastic material comprises a female die and a male die. The female die has a cavity, whose wall has a bottom portion and a top portion. The male die has a backing structure, a support attached to the backing structure and a heat-resistant bladder. A method of manufacturing the part made of the sheet of thermoplastic material comprises the step of applying pressure on the thermoplastic sheet against the wall of the female die from the bottom of the female die to a splitting line of the female die by inflating a deformable portion of the male die.

9 Claims, 7 Drawing Sheets

THERMOPLASTIC PART, TOOL AND METHOD FOR THE MANUFACTURING THEREOF

FIELD OF THE INVENTION

The present invention generally relates to the field of thermoformed plastic materials. More specifically, the invention relates to a novel part, tool and method for forming parts made of sheets of thermoplastic materials.

BACKGROUND OF THE INVENTION

The thermoforming-stamping process for forming reinforced thermoplastic sheets is a process that lies between the forming process of the sheet metal industry and the thermoforming process of plastic industry. On one hand, it is necessary to shape rigid fibers in a composite laminate by pressing them between two mold halves, similarly to the Resin Transfer Molding process or the sheet metal forming process. On the other hand, the heated thermoplastic matrix of the reinforced thermoplastic sheet can better be formed with a vacuum system that allows filling of sharp corners of the part, similar to the thermoforming process of plastic sheets.

The equipment needed for shaping parts made of reinforced thermoplastic sheets includes a thermoforming-stamping press specifically designed for such parts, a sheet supporting equipment allowing tensioning of the sheet, heated ovens, square supporting moving frame to transport the heated sheet from the oven to the forming tools, and a computer based controller to coordinate the molding sequences during all phases of the molding cycle. Two major processes have been used until now to mold parts for medium to high volume productions. The first is the matched-die process that involves the use of two machined steel mold halves, similar to the sheet metal forming industry. The second is the rubber forming process where a rubber male die is used in combination with a machined steel cavity. This process improves the part quality by ensuring good conformation of the reinforced thermoplastic sheet along edges having a small corner radius. It also allows efficient conformation of the part but is rather expensive and difficult to use because the rubber properties must be known precisely and abrasion limits the useful life of the mold. The matched-die forming process for parts made of reinforced thermoplastic sheets is economic for high volume manufacturing of simple parts, but becomes expensive for complex parts because it necessitates the use of a variable thickness mold cavity to ensure complete conformation of the part.

A need therefore exists for an improved molding process and tool for manufacturing parts made of reinforced thermoplastic sheets that overcomes the limits of both the matched die and the rubber forming processes and provides some advantages over them.

SUMMARY OF THE INVENTION

It is an object of the present invention to provide a tool for manufacturing parts made of a sheet of thermoplastic material that overcomes or mitigates one or more disadvantages of known such manufacturing tools, or at least provides a useful alternative.

It is another object of an aspect of the present invention to provide a molding process and tooling for parts made of a sheet of thermoplastic material that is economical to use for medium to high volume production.

It is yet another object of an aspect of the present invention to provide a molding process and tooling for parts made of a sheet of thermoplastic material that provides parts of high quality.

It is a further object of an aspect of the present invention to provide a molding process and tooling capable of producing complex parts made of a sheet of thermoplastic material.

It is a further object of an aspect of the present invention to provide a molding process and tooling particularly suited for the manufacturing parts made of a sheet of fiber-reinforced thermoplastic material.

It is a further object of an aspect of the present invention to provide complex parts made of one or many sheets of thermoplastic materials.

In accordance with an embodiment of the present invention, there is provided a tool for manufacturing a part made of a thermoplastic sheet comprising a female die and a male die. The female die has a cavity, whose wall has a bottom portion and a top portion. The male die has a backing structure, a support attached to the backing structure and a heat-resistant bladder. The bladder has an inlet for connection with a source of compressed fluid. The support is used to support the bladder. The male die further comprises a base attached to the bladder. The base is deformable so as to enter the cavity of the female die. The bladder is adapted to apply a pressure substantially perpendicular to the cavity wall. The base is adapted and positioned to deform the thermoplastic sheet upon entering the cavity by making the thermoplastic sheet first contact the bottom portion of the wall. The bladder expends while applying a pressure on the thermoplastic sheet against the wall from the bottom portion to the top portion.

In accordance with another embodiment of the invention, there is provided a method of manufacturing a part made of a thermoplastic sheet. The method comprises the steps of 1) placing the thermoplastic sheet over a female die, 2) deforming the heated thermoplastic sheet in a cavity of the female die using a deformable portion of a male die; and 3) using the deformable portion of the male die to apply pressure to the heated thermoplastic sheet inside the cavity from the bottom of the cavity to a top of a cavity by inflating the deformable portion.

In accordance with another embodiment of the invention, there is provided a method of manufacturing parts made of a thermoplastic sheet. The method comprises the step of applying pressure on the thermoplastic sheet against a wall of a female die from a bottom of the female die to a splitting line of the female die by inflating a deformable portion of a male die.

In accordance with yet another embodiment of the invention, there is provided a composite part comprising a sheet of fiber-reinforced thermoplastic material and a sheet of non-reinforced thermoplastic material superposedly attached together. Both sheets are jointly deformed substantially differently along different axes.

BRIEF DESCRIPTION OF DRAWINGS

These and other features of the present invention will become more apparent from the following description in which reference is made to the appended drawings wherein:

FIG. 1a shows a cross-section of a sheet of thermoplastic material being heated in an oven in accordance with an embodiment of the present invention.

FIG. 1b shows a cross-sectional side view of a mold in accordance with an embodiment of the present invention.

FIG. 1c shows a cross-sectional side view of the mold of FIG. 1b prior to molding the sheet of FIG. 1a.

FIG. 1d shows a cross-sectional side view of the mold of FIG. 1b closed over the sheet of FIG. 1a.

DETAILED DESCRIPTION OF THE INVENTION

The present invention is a variant of the thermoforming molding process of thermoplastic materials. A deformable male die is used to deform a sheet of thermoplastic material in a cavity of a female mold. The deformable male die is equipped with a bladder that may be inflated in order to apply a pressure on the deformed sheet of thermoplastic material against walls of the female die. Complex parts made of either sheets of fiber-reinforced thermoplastic materials, sheets of non-reinforced thermoplastic materials or a combination of both sheets of fiber-reinforced and non-reinforced thermoplastic materials may be produced using the molding process and tooling of the present invention.

Figures 1A, 1B, 1C:
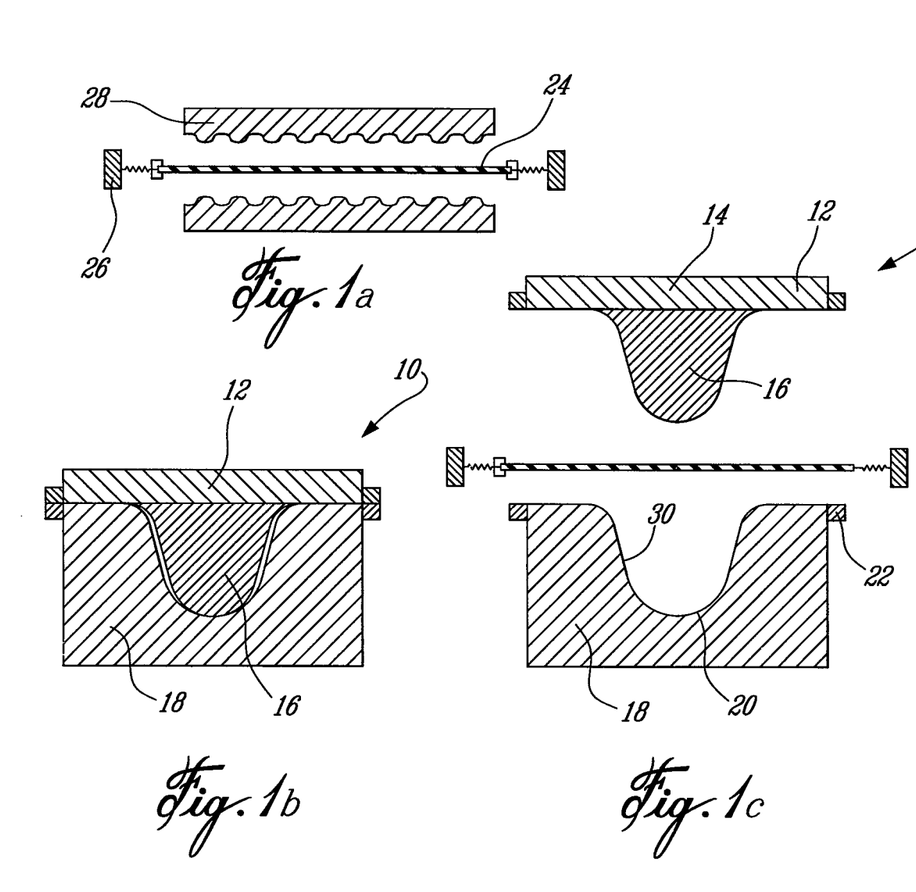

FIG. 1 depicts a mold 10 of the present invention. The mold 10 comprises a male die 12 having a backing structure 14 and a deformable portion 16. The mold 10 further comprises a female die 18 having a cavity 20. The deformable portion 16 is adapted to enter the cavity 20. The deformable portion 16 is higher than a depth of the cavity 20. Both the male die 12 and the female die 18 are adapted to fit together and have clamping means 22 so they can be solidly attached together.

Figure 1D:
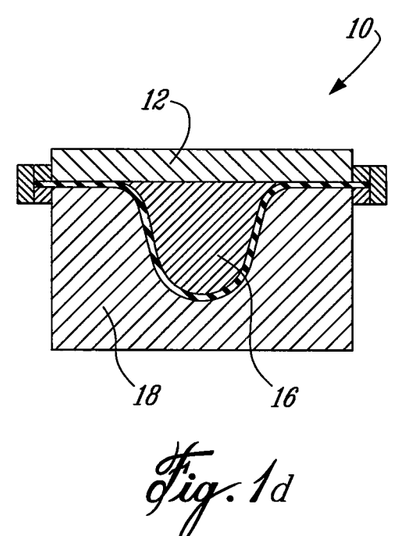

The molding process of the present invention consists in the transformation of a sheet 24, made of a thermoplastic material, into a three dimensional shape provided by the cavity 20. The sheet 24 may either be a plain thermoplastic material or a thermoplastic material reinforced with fibers. The sheet 24 is placed in a sheet handling system 26 which hold the sheet under tension. Using an oven 28 with IR elements, the sheet 24 is at first heated to soften its matrix. Various heating systems like convection, conduction, contact and radiation heating can be used. Infrared radiation (IR) gives the best results, leading to shorter heating time without material degradation. Optimum IR element settings are a compromise between heating time, through thickness temperature distribution and polymer degradation. The sheet 24 is subsequently transferred to the mold 10 and placed between the male die 12 and the female die 18. The mold 10 is closed rapidly to prevent as much as possible the sheet 24 from cooling. Mold closure must be rapid in order to avoid premature matrix cooling, but slow enough to avoid the sheet 24 to wrinkle during the forming phase. This is especially true with reinforced sheets 24.

The deformable portion 16 is made of heat-resistant elastomer. The deformable portion 16 is designed to be both higher and slimmer than the cavity, but to have an overall volume similar to that of the space left in the cavity 20 once the sheet 24 is deformed in it. This requires accurate calibration and the shape of the deformable portion 16 is mostly determined empirically. Upon closing of the mold 10 by displacing the male die 12 towards the female die 18, the deformable portion 16 comes into contact with the sheet 24 and deforms it. Because the height of the deformable portion 16 is more than the depth of the cavity 20, the deformed sheet 24 touches the bottom portion of a wall 30 of the cavity 20 first. As the male die 12 is gradually closed unto female die 18, the deformable portion 16 gradually deforms, reducing its height and increasing in size in other directions. The desired effect is that a pressure is gradually applied by the deformable portion 16 on the sheet 24 against the wall 30 of the cavity 20, starting from the bottom towards the top of the cavity 20. This ensures an adequate draping of the sheet 24 in the cavity 20. As pressure is always applied perpendicularly to the wall 30, minimum shearing occurs and an adequate consolidation of the material is possible. The pressure is adjusted by selecting an adequate hardness of the deformable portion 16 and adequate dimensions as well. Pressure on the lateral walls of the cavity 20 is generated by the deformation of the deformable portion 16 in direction of the wall 30. This is an advantage over prior art tools as it is no longer required to use large draft angles. With the mold of the present invention, very shallow draft angles may be used and pressure is always applied perpendicularly to the wall 30, thanks to the lateral deformation of the deformable portion 16. With the tool of the present invention, pressure is not only generated in the closing axis of the mold 10 but is generated perpendicularly to the walls of the cavity.

Figure 2:
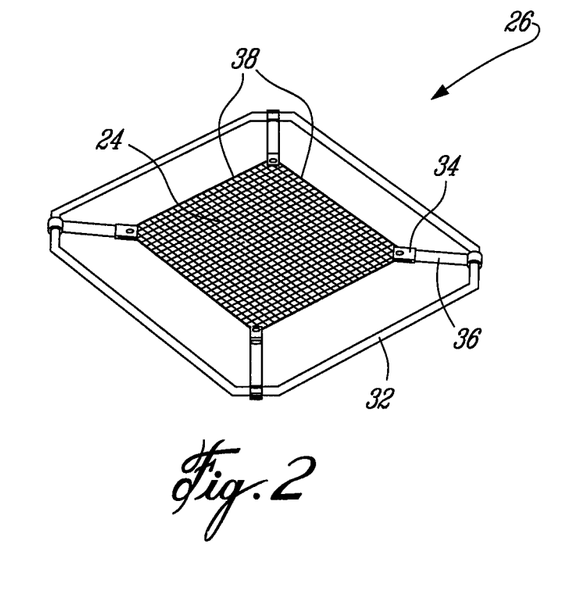
FIG. 2 is a perspective view of a sheet handling system in accordance with an embodiment of the present invention.
Figure 3:
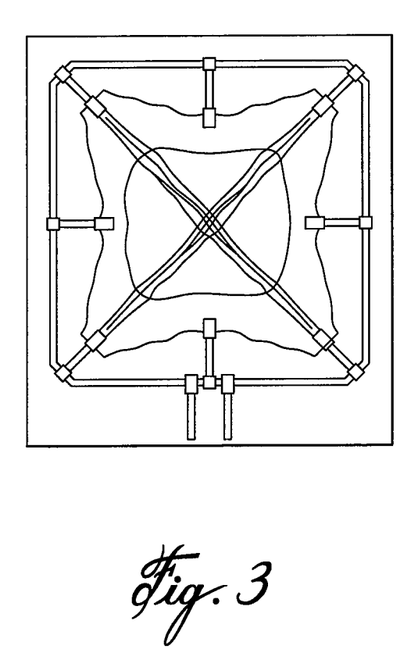
FIG. 3 is a plan view of a sheet handling system holding a molded part atop a female die in accordance with another embodiment of the present invention.

The sheet handling system 26 ensures transportation of the sheet 24 from the oven 28 to the mold 10 and acts as a tensioning system on the sheet 24 to avoid wrinkles being formed in a part. The sheet handling system depicted is especially adapted for reinforced sheets of thermoplastic materials. Conventional thermoforming sheet handling systems for unreinforced sheets of thermoplastic materials are not appropriate for thermoforming reinforced sheets due to the stiffness of the fibers. FIG. 2 shows the sheet handling system 26 that has been developed to mold sheets made of reinforced thermoplastic materials. A reusable frame 32 is shaped to surround the sheet 24. The frame 32 is preferably made of a material that is heat resistant to at least 500° C. Conveniently, because of its surrounding shape, the frame 32 does not interfere with the IR rays of the heating system during the heating stage. "C" clamps 34, equipped with constant tension springs 36 are positioned at each corner of the frame 32. Optionally, additional "C" clamps 34 may be positioned along edges 38 of the sheet 24 to further support it. The "C" clamps 34 ensure appropriate clamping and sufficient tension on the sheet 24 while keeping a good control of the sheet position during the forming process. They also allow sufficient displacements of the edges 38 and are capable of following the movements of these edges during the forming process. During the forming process, the springs 36 will deform differently, depending on the shape the sheet 24 has to conform to, as shown in FIG. 3.

Figure 4:
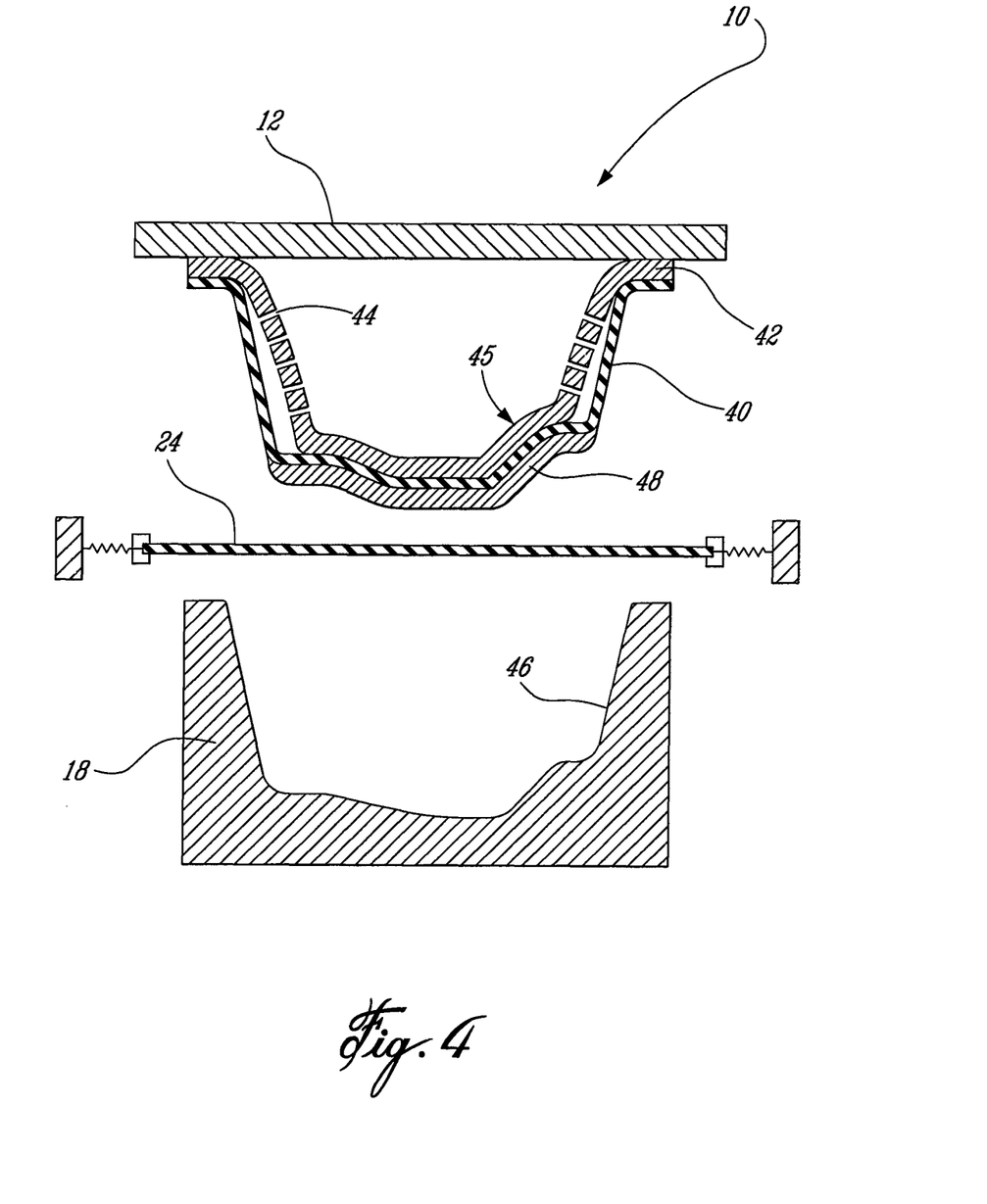
FIG. 4 shows a cross-sectional side view of a mold in accordance with another embodiment of the present invention.

Turning now to FIG. 4, there is shown a schematic of the process of another embodiment of the present invention. An inflatable bladder 40 is maintained by a rigid sub-structure 42 fixed to the male die 12 of the mold 10. During molding, a vacuum is applied inside the rigid sub-structure 42 and, via holes 44 drilled through its walls 45, the bladder 40 is maintained retracted against the sub-structure 42. This allows the sheet 24 to move freely along the side wall 46 during mold closure, avoiding friction between the sheet 24 and the female die 18. In a first step, a rigid base 48 forms a bottom portion of the part, similar to the matched-die process, and in a second step, the vacuum in the sub-structure is changed for air pressure to allow the bladder 40 to conform the side walls 46 of the part.

Advantageously, the process of the present invention reduces thickness variations over the surface of the part due to the application of a uniform pressure by the bladder 40 and evens the consolidation of the part. The cycle times of this process are similar to the matched-die process because the rigid sub-structure 42 can rapidly push the sheet 24 at the bottom of the mold. This process makes it possible to mold medium volumes of parts at low cost. The conformation of small radius edges and corners of the part are possible. It is possible to use bladders 40 made by stacking rubber layers of different hardness in order to improve the forming of small geometric features of the part. Advantageously, friction between the bladder 42, made of a deformable material, and the tools is avoided because the rigid base 48 acts as an abrasion protector while the sides of the bladder 40, under vacuum, do not slide on the sheet 24. Only normal pressures are then sustained by the bladder 40, thus preserving its integrity for a longer period.

The materials used for the bladder 40 are numerous but best results are obtained with bladders having high tearing and abrasion resistances. High tearing resistance can be obtained using an elastomer, such as a rubber.

Figure 5:
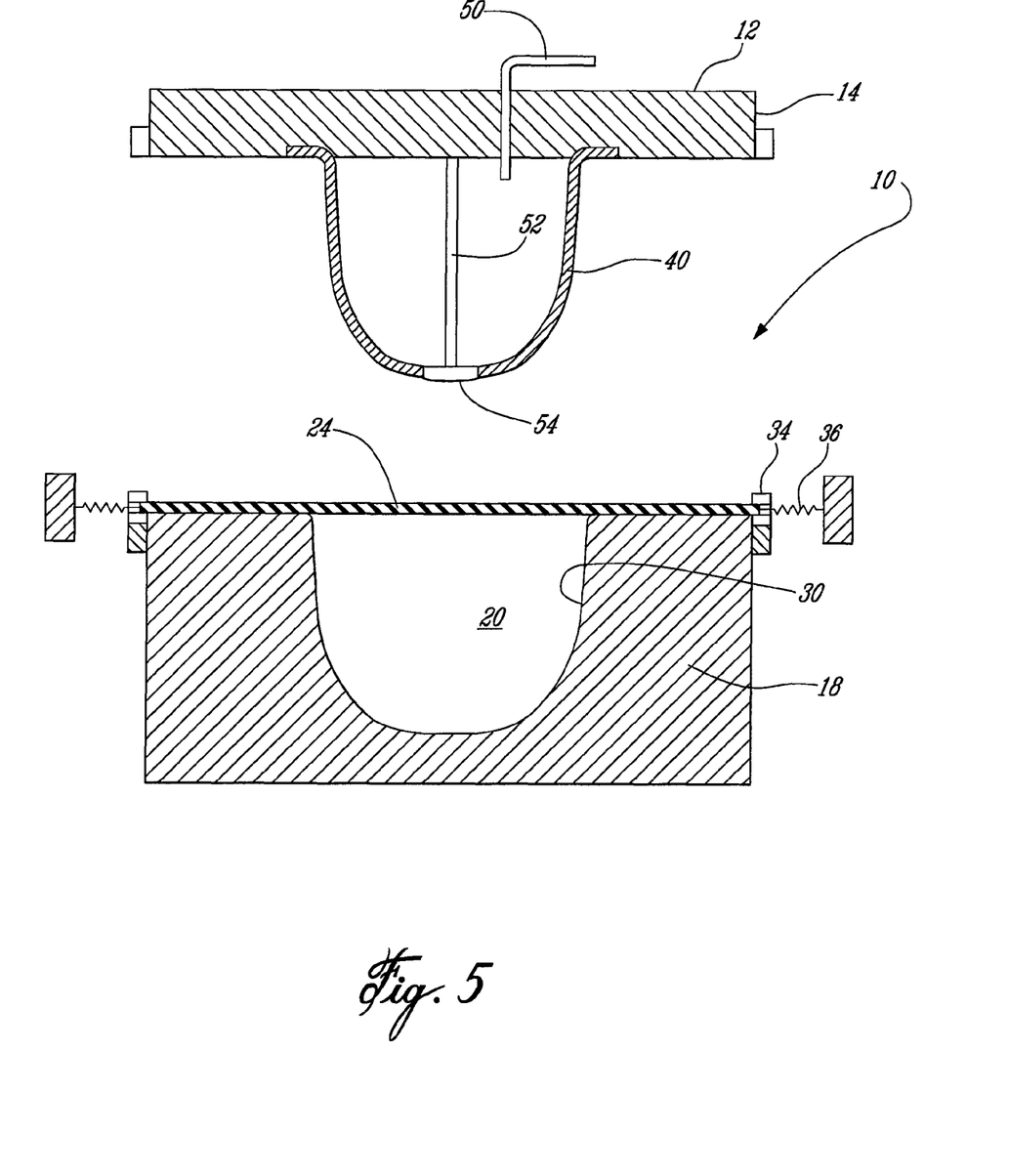
FIG. 5 shows a cross-sectional side view of a mold in an open position in accordance with another embodiment of the invention.

FIG. 5 depicts another embodiment of the invention. The mold 10 comprises a male die 12 having a backing structure 14 to which is sealably attached an inflatable bladder 40 on its periphery. An inlet/outlet 50 is connected to the bladder 40 to provide a fluid, such as air, to be pumped inside the bladder 40 and to pressurize it. A support 52 supports the center portion 54, which is made of a resilient material such as rubber. The female die 18 has its cavity 20 that will provide the shape to the part to be manufactured from the sheet 24. Once again, the sheet 24 is held in place by the "C" clamps 34 attached to the frame 32 which stretches the sheet 24 such as to minimize wrinkles during the forming process. FIG. 5 shows the sheet 24 already heated and placed on the female die 18, ready to be formed by the male die 12.

In use, the male die 12 is lowered toward the female die 18 such that a center portion 54 of the bladder 40, held in place by the support 52, starts deforming the sheet 24, until the backing structure 14 comes into contact with the female die 18. At this point, the center portion 54 is deformed as it presses the sheet 24 against the bottom portion of the wall 30 of the cavity 20. Both dies are clamped together and air is pumped in the inflatable bladder 40 through the inlet/outlet 50.

Figure 6:
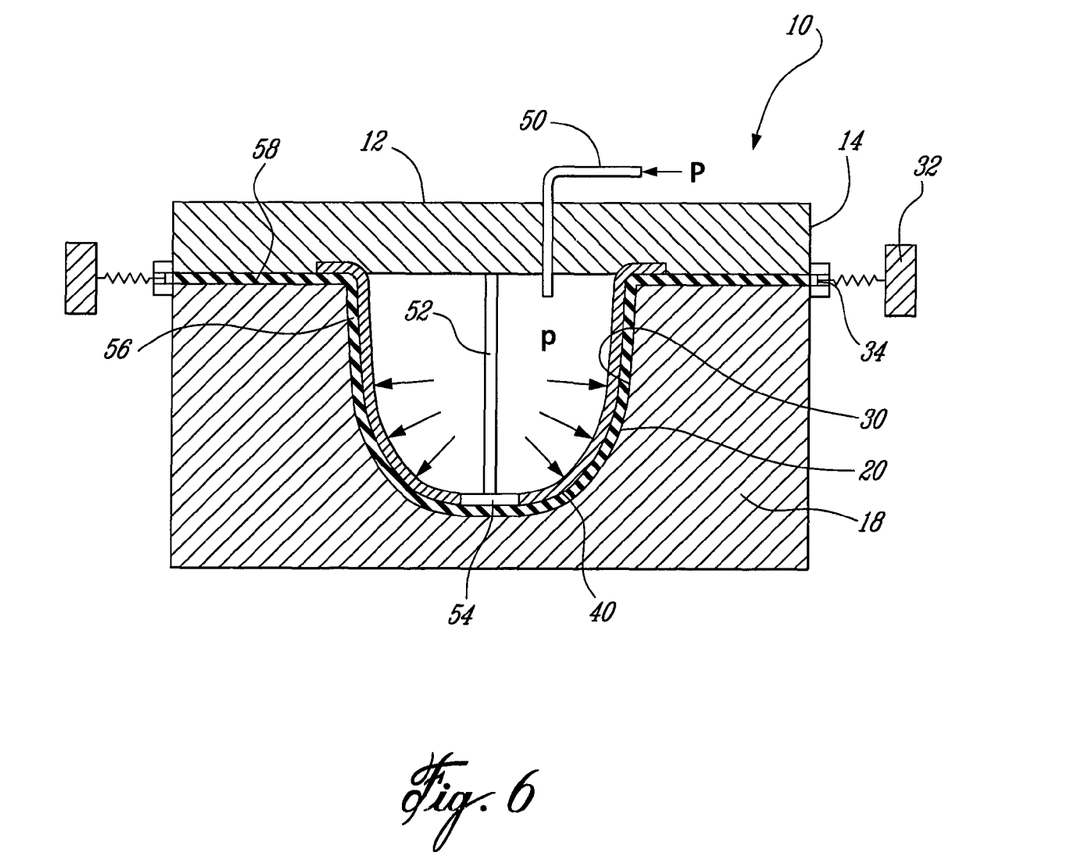
FIG. 6 shows a cross-sectional side view of the mold of FIG. 5 in a closed position.

As shown in FIG. 6, the bladder 40 inflates, pressing the remaining of the sheet 24 against the wall 30 of the cavity 20, from the bottom portion of the wall 30 to a top portion of the wall 30. Pressure is increased sufficiently to ensure adequate consolidation of the sheet 24. Once the part has cooled sufficiently, the mold 10 may be opened and the molded part 56 may be removed from the mold 10. The next step is to trim the part 56 to get rid of the unused flange 58. Once again, pressure is first applied on the sheet 24 against the bottom wall of the cavity 20 by center portion 54. Pressure is then applied gradually towards the top of the cavity 20 by the deployment of the bladder 40.

Another sheet 24, already mounted in another frame 32 and heated to the right temperature is ready to be placed between the two mold halves for forming. The cycle time of this process may be quite rapid. Cycle time of some parts is down to a few minutes.

Different materials may be used for the female and male dies. For the die being contacted by the sheet 24, a thermally conductive material, such as aluminum or steel is preferred so that mold temperature may be controlled. Wood or medium density fiber (MDF) may also be considered for small quantities. The bladder 40 and the center portion 54 are made of a deformable and/or resilient material capable of withstanding the high temperatures reached.

When using fiber-reinforced thermoplastic sheets, the process of the present invention allows for considerable deformation of the fiber reinforcement within the sheet. Whereas with prior art processes, fiber-reinforced thermoplastic sheets were mostly transformed into cylindrical or conical parts, the new process allows part manufactured with such materials to have complex geometries and to stretch the fiber reinforcement differently along each of its different axes. Two or more parts may subsequently be welded in order to achieve parts of a higher level of complexity.

Many combinations of fiber and matrix may be used for fiber-reinforced sheets. Typical fibers generally used to manufacture thermoset composites may still be used with the fiber-reinforced thermoplastic sheets, namely, glass fiber, carbon fiber and aramid fiber in different conventional weave patterns. Typical materials used for the thermoplastic matrix are polyethermide (PEI), polyphenylene sulfide (PPS), polypropylene (PP), nylon 6 (PA 6) and nylon 12 (PA12). It has been found that a thermoplastic sheet having a lower high melt strength performs better in the manufacturing process of the present invention. More specifically, a thermoplastic sheet having a high melt strength equal or lower than 23 is preferred.

Figure 7:
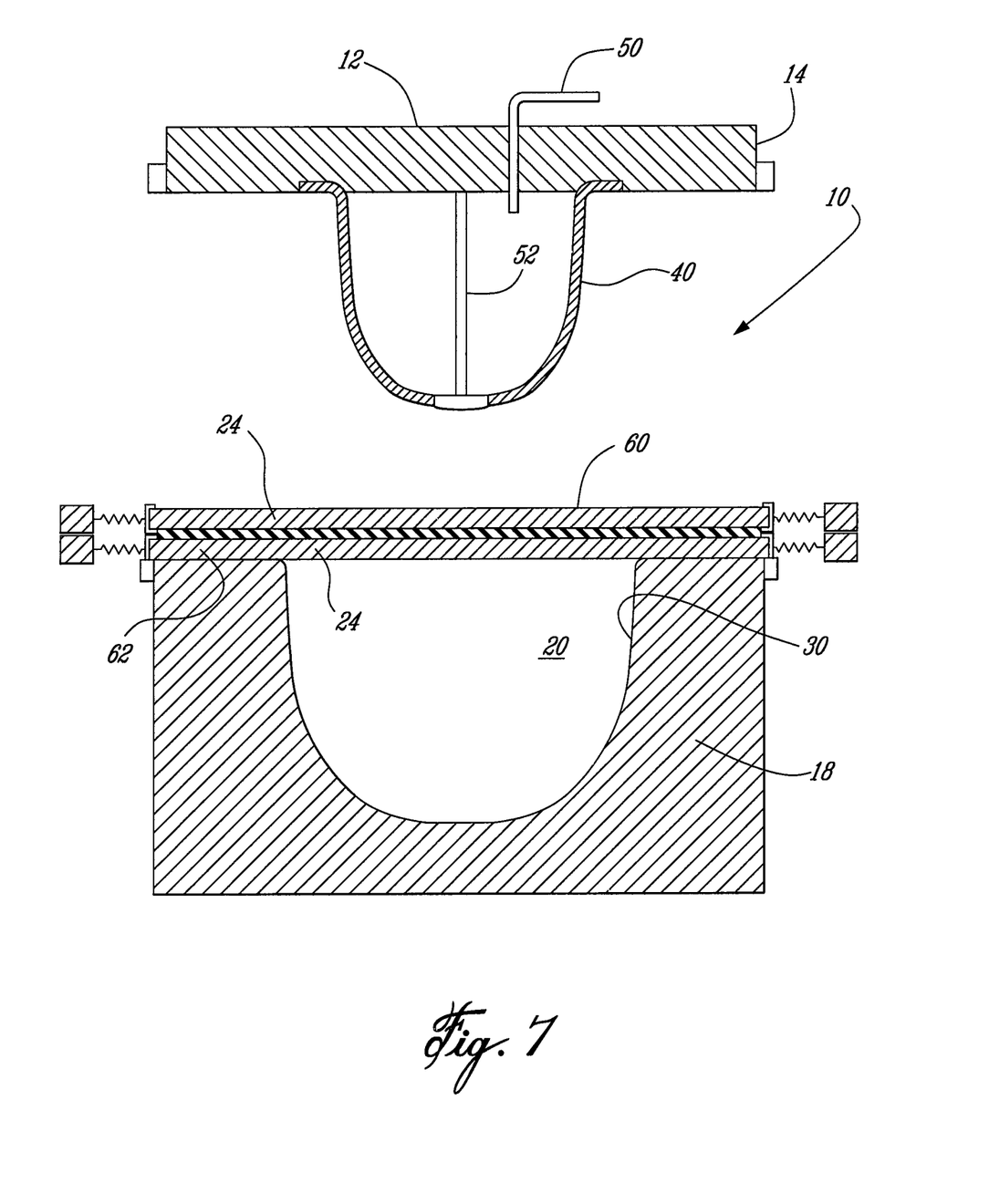
FIG. 7 shows a cross-sectional side view of a mold prior to molding two sheets of thermoplastic materials in accordance with another embodiment of the present invention.
Figure 8A:
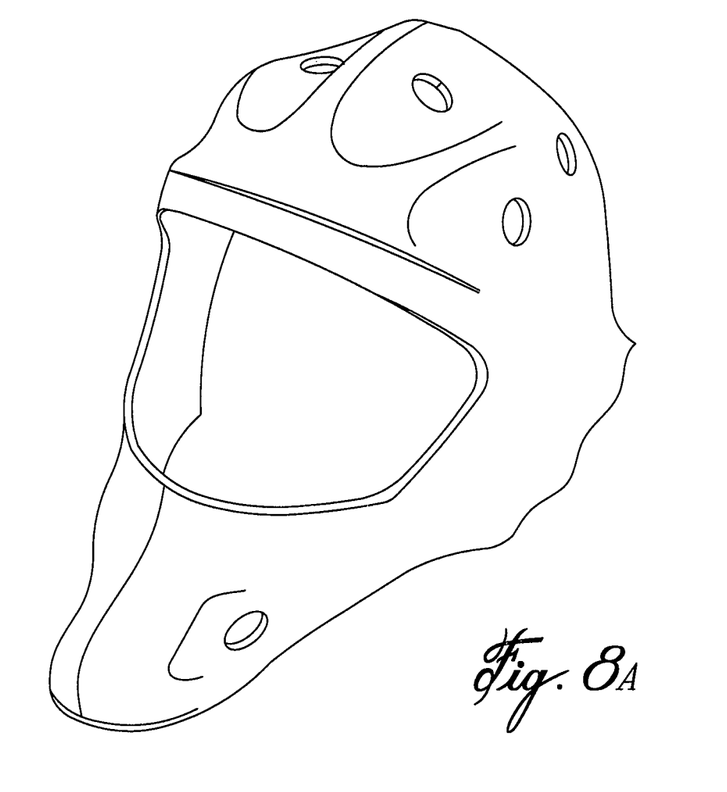
FIG. 8a shows a first example of a part manufactured in accordance with an embodiment of the present invention.
Figure 8B:
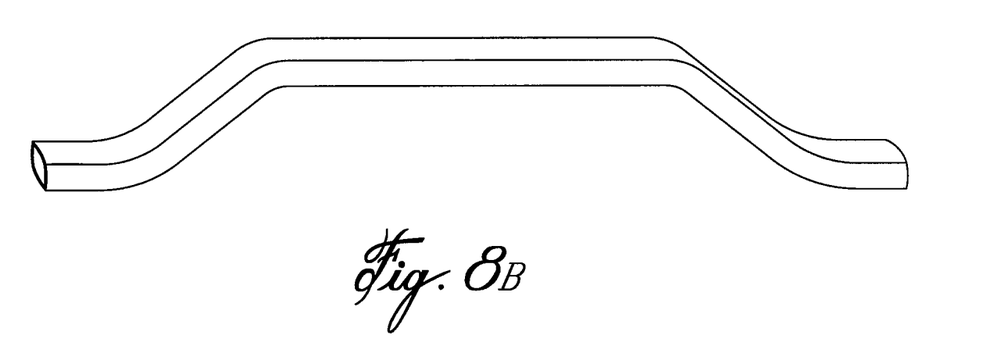
FIG. 8b shows a second example of a part manufactured in accordance with an embodiment of the present invention.

It happens that the physical properties of a single type of thermoplastic material do not completely meet the requirements of an intended product. For example, some parts may require the combination of high rigidity, impact absorption and high gloss finish, properties that may only be partially met if a single type of thermoplastic were used. In a variant of the present invention, parts made of more than one sheet of thermoplastic materials may be molded. FIG. 7 depicts such an embodiment. In an example of this embodiment, two superposed sheets 24 of thermoplastic materials are placed in a reusable frame 32, each held separately by the "C" clamps 34. One sheet may be a fiber-reinforced thermoplastic material 60 while the other may be a non-reinforced thermoplastic material 62. The types of thermoplastic materials may also be different also. Each sheet 24 is placed in the oven 28 (not shown) to be heated. When ready, the sheets 24 are placed over the female mold 18. Depending on the result desired, the placement of the sheets 24 may be important. For example, if a high gloss surface finish of the molded part is important, the sheet providing this property should be placed first over the female mold 18. In the present example, the sheet of non-reinforced thermoplastic material 62 is placed directly over the female mold 18 and the sheet of fiber-reinforced thermoplastic material 60 is placed on top of the sheet of non-reinforced thermoplastic material 62. If the type of thermoplastic material is the same, both sheets 24 will bond together during molding. However, if the type of thermoplastic material is incompatible or if their glass transition temperatures ($T_g$) are in different ranges such that both sheets will not bond together during molding, it may be required to use an adhesion film (such as those manufactured by Collano™) in between both the sheet of fiber-reinforced thermoplastic material 60 and the sheet of non-reinforced thermoplastic material 62. When required, the adhesive film is placed directly on the sheet 24 having the highest $T_g$. As previously described, the male mold 12 then enters the female mold 18, jointly deforming both sheets 24 in the process. Pressure is applied in the bladder 40 until the molded part is ready to be taken out of the mold 10. There results from this process molded parts having deformation substantially different along their different axes. Such parts are illustrated in FIGS. 8a and 8b and respectively represent a shock resistant hockey goalie mask and a light weight aerospace duct part, which may take various shapes, and which meets the FAA requirements for material fire safety.

The present invention has been described with regards to preferred embodiments. The description as much as the drawings, were used to help the understanding rather than to limit the scope of the invention. It will be obvious to one skilled in the art that several modifications or variations may be brought to the invention without departing from the scope of the invention as described herein and are intended to be covered by the present description.

The invention claimed is:

1. A composite part comprising:
    a sheet of fiber-reinforced thermoplastic material; and
    a sheet of non-reinforced thermoplastic material superposedly attached to said sheet of fiber-reinforced thermoplastic material, wherein both of said sheets are jointly deformed substantially differently along different axes to form a cavity and wherein said sheet of fiber-reinforced thermoplastic has a thickness which varies over said cavity, the thickness of the fiber-reinforced thermoplastic being substantially thinner over said cavity than elsewhere;
    wherein the fiber is provided in the form of a weave in the sheet of fiber-reinforced thermoplastic material.

2. The part of claim 1 further comprising an adhesion film between said sheet of fiber-reinforced thermoplastic material and said sheet of non-reinforced thermoplastic material.

3. The part of claim 2 wherein a glass transition temperature of said sheet of fiber-reinforced thermoplastic material is in a different range than a glass transition temperature of said sheet of non-reinforced thermoplastic material.

4. The part of claim 1, wherein said sheet of fiber-reinforced thermoplastic material and said sheet of non-reinforced thermoplastic material have their thermoplastic material selected from the group consisting of polyetherimide, polyphenylene sulfide, polypropylene, nylon 6 and nylon 12.

5. The part of claim 4, wherein said fiber of said sheet of fiber-reinforced thermoplastic material is selected from the group consisting of glass fiber, carbon fiber and aramid fiber.

6. The part of claim 1 wherein both said sheet of fiber-reinforced thermoplastic material and said sheet of non-reinforced thermoplastic material have a high melt strength of 23 or less.

7. A composite part comprising:
    a first sheet of thermoplastic material; and
    a second sheet of thermoplastic material superposedly attached to said first sheet of thermoplastic material;
    wherein:
    both of said sheets are jointly deformed to form a cavity, said sheets of thermoplastic material having a thickness that varies over the cavity such that the thickness of said sheets is thinner over the cavity than elsewhere;
    wherein the first sheet of thermoplastic material is a sheet of fiber-reinforced thermoplastic material, the second sheet of thermoplastic material is a sheet of non-reinforced thermoplastic material; and
    the fiber is provided in the form of a weave in the sheet of fiber-reinforced thermoplastic material.

8. The part of claim 7, further comprising a film of adhesive material sandwiched between the two sheets of thermoplastic material.

9. An article comprising at least two of the composite part recited in claim 7, welded together.

* * * * *